United States Patent
Horihata (10) Patent No.: US 9,294,027 B2
(45) Date of Patent: Mar. 22, 2016

(54) ROTATING ELECTRIC MACHINE FOR VEHICLES

(71) Applicant: DENSO CORPORATION, Kariya, Aichi-pref. (JP)

(72) Inventor: Harumi Horihata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/288,935

(22) Filed: May 28, 2014

(65) Prior Publication Data
US 2014/0375282 A1  Dec. 25, 2014

(30) Foreign Application Priority Data

Jun. 21, 2013  (JP) .................. 2013-130155

(51) Int. Cl.
*H02P 9/00* (2006.01)
*H02P 29/02* (2006.01)

(52) U.S. Cl.
CPC .............. *H02P 9/009* (2013.01); *H02P 29/021* (2013.01)

(58) Field of Classification Search
CPC ........................................ H02P 9/009
USPC ............................................. 318/504, 494, 34
See application file for complete search history.

(56) References Cited

U.S. PATENT DOCUMENTS

| 6,799,656 | B2 * | 10/2004 | Kimura | B62D 5/049 180/443 |
| 7,174,270 | B2 * | 2/2007 | Kokubo et al. | 702/151 |
| 8,670,904 | B2 * | 3/2014 | Yoneda et al. | 701/42 |
| 2009/0240389 | A1 * | 9/2009 | Nomura et al. | 701/29 |

FOREIGN PATENT DOCUMENTS

| JP | A-8-205303 | 8/1996 |
| JP | A-2008-296709 | 12/2008 |

* cited by examiner

*Primary Examiner* — David S Luo
(74) *Attorney, Agent, or Firm* — Oliff PLC (57) ABSTRACT

A rotating electric machine for vehicles has a rotor, a stator having stator windings, MOS module groups as electric power converters, a rotation angle sensor that detects a rotation angle of the rotor, and a control circuit that has a rotation angle sensor abnormality determining section that determines whether abnormalities of the rotation angle sensor exist or not based on a phase voltage induced by the stator windings during the power generation.

9 Claims, 7 Drawing Sheets

ROTATING ELECTRIC MACHINE FOR VEHICLES

CROSS-REFERENCE TO RELATED APPLICATION

This application is based on and claims the benefit of priority from earlier Japanese Patent Application No. 2013-130155 filed Jun. 21, 2013, the description of which is incorporated herein by reference.

TECHNICAL FIELD

The present disclosure relates to a rotating electric machine for vehicles installed in a passenger car, a track, and the like.

BACKGROUND

Conventionally, a control system of an electric vehicle that determines abnormalities of sensors by having a composition of a double-sensor system is known (refer to Japanese Patent Application Laid-Open Publication No. H8-205303, for example).

A rotational speed detected by one of the rotational speed sensors is calculated based on information sampling an encoder pulse, and another rotational speed from another one of rotational speed sensors is calculated based on information sampling another encoder pulse.

Then, when a deviation of these two calculated results is smaller than a predetermined value, it is determined that the sensors are normal, and when the results is larger than the predetermined value, it is determined that abnormalities have arisen in the sensors.

In the composition of the Publication No. H8-205303 mentioned above, since two sensors are needed, it is necessary to secure a mounting space for these two sensors, while the mounting space needs to be expanded in order to detect the abnormalities of the sensors, and there is a problem that cost of components and cost of the whole product increase.

SUMMARY

An embodiment provides a rotating electric machine for vehicles that requires no expansion of a mounting space in order to detect abnormalities of a rotation angle sensor, and can suppress cost increase.

In a rotating electric machine for vehicles according to a first aspect, the rotating electric machine includes a rotor, a stator disposed facing to the rotor and having stator windings, an electric power converter that converts an alternating, current voltage induced by the stator windings into a direct current voltage, or converts the direct current voltage applied from outside into the alternating current voltage and applies thereof to the stator windings, a rotation angle sensor that detects a rotation angle of the rotor, and a rotation angle sensor abnormality determining section that determines whether abnormalities of the rotation angle sensor exist based on a phase voltage induced by the stator windings during power generation.

Since it is not necessary to provide two rotation angle sensors in order to detect the abnormalities of the rotation angle sensor, the expansion of the mounting space like a case of mounting the two rotation angle sensors becomes unnecessary, and the increase in cost of components or cost of the whole product can be suppressed.

In the rotating electric machine for the vehicles according to a second aspect, the rotation angle sensor abnormality determining section determines that the rotation angle sensor has abnormalities when a first rotational speed detected based on the phase voltage induced by the stator windings and a second rotational speed detected based on an output of the rotation angle sensor do not match.

In the rotating electric machine for the vehicles according to a third aspect, the electric power converter has a bridge circuit constituted by a plurality of switching elements where a diode is connected in parallel with the switching element, and the rotation angle sensor abnormality determining section determines whether any abnormalities of the rotation angle sensor exist or not during a diode rectification that sends current through the diode during the power generation.

In the rotating electric machine for the vehicles according to a fourth aspect, the diode rectification is performed during a low output power generation that is below a predetermined output, and the rotation angle sensor abnormality determining section determines whether abnormalities of the rotation angle sensor exist or not during the low output power generation.

In the rotating electric machine for the vehicles according to a fifth aspect, there is further provided a voltage comparator that compares the phase voltage induced by the phase winding of the stator winding with a predetermined threshold, and detects a timing at which the phase voltage exceeds the predetermined threshold, and the rotation angle sensor abnormality determining section computes the first rotational speed based on a repetition interval of the timing detected by the voltage comparator.

In the rotating electric machine for the vehicles according to a sixth aspect, the predetermined threshold is configured to be a voltage lower than a ground voltage, or to a voltage higher than a positive side voltage of a battery connected outside.

In the rotating electric machine for the vehicles according to a seventh aspect, there is provided a plurality of the voltage comparators corresponding to the stator windings, and the rotation angle sensor abnormality determining section computes the first rotational speed for each of the plurality of the voltage comparators.

In the rotating electric machine for the vehicles according to an eighth aspect, the stator winding includes a plurality of three-phase windings, the voltage comparator is provided corresponding to each of the plurality of the three-phase winding, and the rotation angle sensor abnormality determining section computes the first rotational speed for each of the plurality of voltage comparators corresponding to the plurality of the three-phase windings.

In the rotating electric machine for the vehicles according to a ninth aspect, the rotation angle sensor abnormality determining section determines that the rotation angle sensor has abnormalities when none of a plurality of the first rotational speeds corresponding to the plurality of voltage comparators match the second rotational speed detected by the rotation angle sensor.

In the rotating electric machine for the vehicles according to a tenth aspect, when it is determined by the rotation angle sensor abnormality determining section that the rotation angle sensor has abnormalities, there is provided a means for externally notifying an occurrence of the abnormalities.

DETAILED DESCRIPTION OF THE PREFERABLE EMBODIMENTS

With reference to the accompanying drawings, hereinafter will be described an embodiment of the present disclosure.

Figure 1:
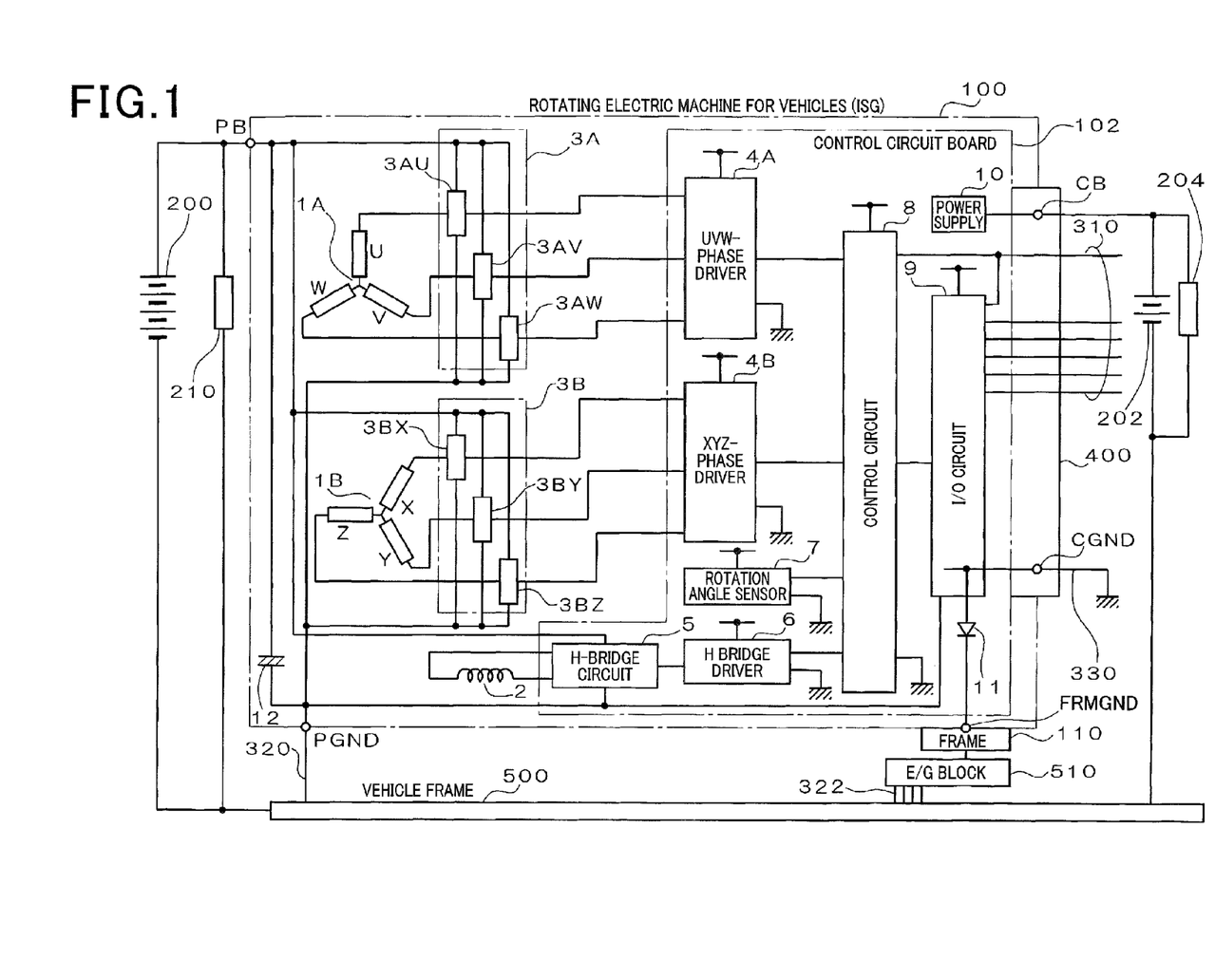
FIG. 1 shows a composition of a rotating electric machine for vehicles of an embodiment.

As shown in FIG. 1, a rotating electric machine 100 for vehicles of an embodiment is constituted including two stator windings 1A and 1B, a field winding 2, two MOS module groups 3A and 3B, a UVW-phase driver 4A, an XYZ-phase driver 4B, an H-bridge circuit 5, an H bridge driver 6, a rotation angle sensor 7, a control circuit 8, an input/output circuit 9, a power supply circuit 10, a diode 11, and a capacitor 12.

The present rotating electric machine 100 is called an ISG (integrated starter generator), and has functions of both an electric motor and a generator.

One of the stator windings 1A is a three-phase winding composed of a U-phase winding, a V-phase winding, and a W-phase winding, and is wound around a stator core (not shown).

Similarly, another one of the stator windings 1B is a three-phase winding composed of an X-phase winding, a Y-phase winding, and a Z-phase winding, and is wound around the stator core mentioned above in a position shifted 30 degrees by an electric angle relative to the stator winding 1A.

A stator is constituted by these two stator windings 1A and 1B and the stator core in the present embodiment.

It should be noted that number of phases for each stator winding 1A and 1B may be other than three.

The field winding 2 is for making a rotor, which has a rotational shaft that inputs and outputs a driving force between an engine via a belt or a gear, generates a magnetic field, and is wound around a field pole (not shown) to constitutes the rotor.

One of the MOS module groups 3A is connected to one of the stator windings 1A, and a three-phase bridge circuit is constituted by the whole.

This MOS module group 3A operates as an electric power converter that converts an alternating current voltage induced by the stator winding 1A during a power generation into a direct current voltage, and converts the direct current voltage applied from outside (high-voltage battery 200) into the alternating current voltage and applies thereof to the stator winding 1A during operation as an electric motor.

The MOS module group 3A has three MOS modules 3AU, 3AV, and 3AW corresponding to the number of the phases of the stator winding 1A.

The MOS module 3AU is connected to the U-phase winding included in the stator winding 1A. The MOS module 3AV is connected to the V-phase winding included in the stator winding 1A. The MOS module 3AW is connected to the W-phase winding included in the stator winding 1A.

Figure 2:
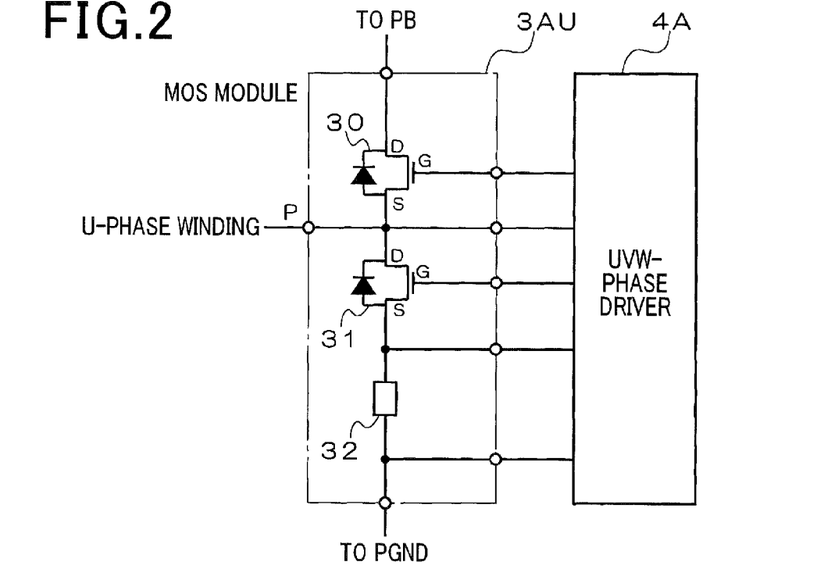
FIG. 2 shows a composition of a MOS module.

As shown in FIG. 2, the MOS module 3AU has two MOS transistors 30 and 31 and a current detection resistor 32.

One of the MOS transistors 30 is a switching element of an upper arm (high side) in which a source is connected to the U-phase winding of the stator winding 1A and a drain is connected to a power supply terminal PB.

The power supply terminal PB is connected to a positive terminal of the high-voltage battery 200 (a first battery) with the rating of 48V, or a high-voltage load 210, for example.

Another one of the MOS transistor 31 is a switching element of a lower arm (low side) in which a drain is connected to the U-phase winding and a source is connected to a power ground terminal PGND through the current detection resistor 32.

A series circuit of the two MOS transistors 30 and 31 is disposed between the positive terminal and a negative terminal of the high-voltage battery 200, and the U-phase winding is connected to the connection point of the two MOS transistors 30 and 31 through a P terminal.

Moreover, a gate and a source of the MOS transistor 30, a gate of the MOS transistor 31, and both ends of the current detection resistor 32 are connected to the UVW-phase driver 4A.

A diode is connected in parallel with the MOS transistor between the source and the drain of each MOS transistor 30 and 31.

Although the diode is realized by a parasitic diode (body diode) of the MOS transistors 30 and 31, the diode may be further prepared as another component and connected in parallel with the MOS transistor.

In addition, at least either one of the upper arm and the lower may be constituted by a switching element other than the MOS transistor.

In addition, the MOS modules 3AV, 3AW and MOS modules 3BX, 3BY, and 3BZ mentioned later other than the MOS module 3AU fundamentally have the same composition as the MOS module 3AU, thus detailed explanation is omitted.

Another one of the MOS module groups 3B is connected to another one of the stator windings 1B, and a three-phase bridge circuit is constituted by the whole.

This MOS module group 3B operates as an electric power converter that converts an alternating current voltage induced by the stator winding 1B during a power generation into a direct current voltage, and converts the direct current voltage applied from outside (high-voltage battery 200) into the alternating current voltage and applies thereof to the stator winding 1B during operating as an electric motor.

The MOS module group 3B has three MOS modules 3BX, 3BY, and 3BZ corresponding to the number of the phases of the stator winding 1B.

The MOS module 3BX is connected to the X-phase winding included in the stator winding 1B. The MOS module 3BY is connected to the Y-phase winding included in the stator winding 1B. The MOS module 3BZ is connected to the Z-phase winding included in the stator winding 1B.

The UVW-phase driver 4A generates a driving signal inputted into each gate of the MOS transistors 30 and 31 included in each of three MOS modules 3AU, 3AV, and 3AW, while detecting the potential difference across the current detection resistor 32.

Similarly, the XYZ-phase driver 4B generates a driving signal inputted into each gate of the MOS transistors 30 and 31 included in each of three MOS modules 3BX, 3BY, and 3BZ, while detects both-end voltage of the current detection resistor 32.

The H-bridge circuit 5 is connected to the both ends of the field winding 2, and is a magnetization circuit that supplies exciting current to the field winding 2.

Figure 3:
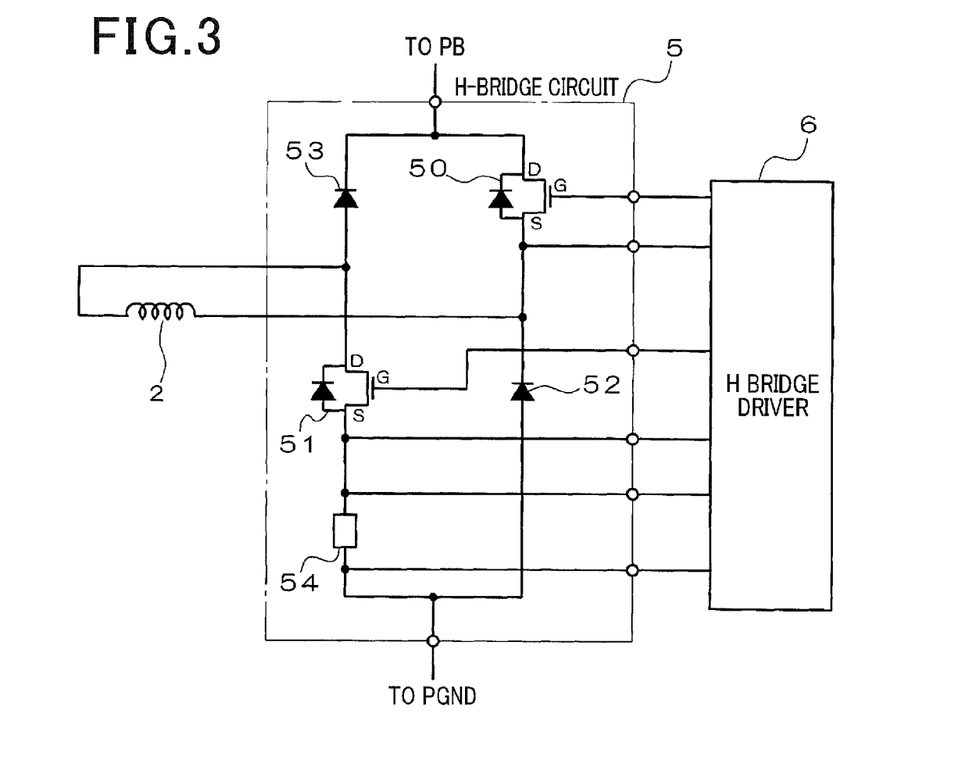
FIG. 3 shows a composition of an H-bridge circuit.

As shown in FIG. 3, the H-bridge circuit 5 has two MOS transistors 50 and 51, two diodes 52 and 53, and a current detection resistor 54.

The MOS transistor 50 on the high side and the diode 52 on the low side are connected in series, and one end of the field winding 2 is connected at this connection point.

Moreover, the diode 53 on the high side, the MOS transistor 51 on the low side, and the current detection resistor 54 are connected in series, and the another end of the field winding 2 is connected at a connection point of the diode 53 and the MOS transistor 51.

This H-bridge circuit 5 is connected to both the power supply terminal PB and the power ground terminal PGND.

Exciting current is supplied to the field winding 2 from the H-bridge circuit 5 by turning on the MOS transistors 50 and 51.

Moreover, the supply of the exciting current is stopped by turning either one of the MOS transistors 50 and 51 off, while the exciting current that flows through the field winding 2 through either one of the diodes 52 and 53 can be returned.

The H bridge driver 6 generates a driving signal inputted into each gate of the MOS transistors 50 and 51 included in the H-bridge circuit 5, while detecting the potential difference across the current detection resistor 54.

The rotation angle sensor 7 detects a rotation angle of the rotor. The rotation angle sensor 7 can be constituted by using a permanent magnet and a Hall element (Hall effect sensor), for example.

Figure 4:
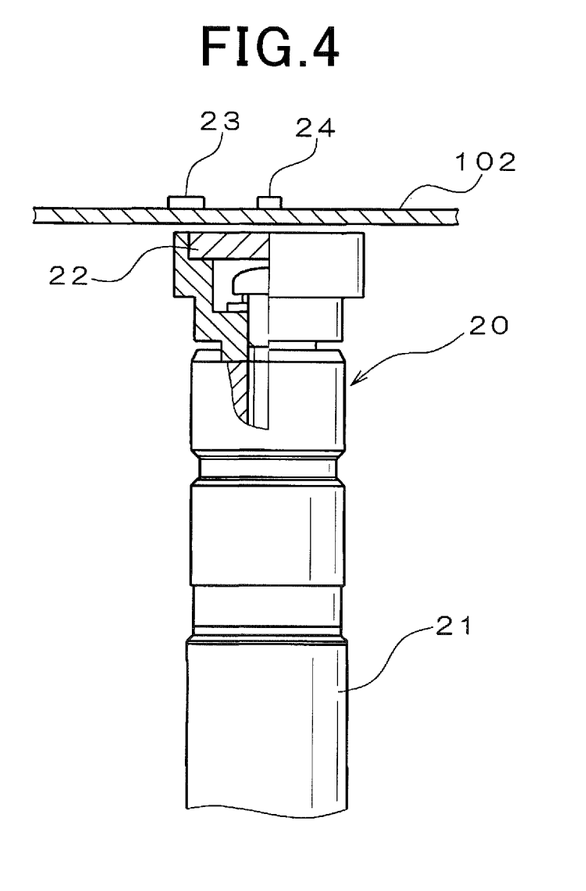
FIG. 4 shows a specific example of disposition of a rotation angle sensor.

As specifically shown in FIG. 4, the permanent magnet 22 is fixed at a tip of a rotational shaft 21 of the rotor 20, while the Hall elements 23 and 24 are disposed in positions that face the permanent magnet 22 (disposed in the positions near a perimeter of the permanent magnet 22 and 90 degrees apart mutually, for example).

By taking out an output, the rotation angle of the rotor 20 that rotates with the permanent magnet 22 can be detected.

In addition, the rotation angle sensor 7 may be constituted without using the Hall elements 23 and 24.

Moreover, the disposition and the method of mounting of the permanent magnet 22 shown in FIG. 4 are just an example, and may be altered suitably according to the rotational shaft 21 or its surrounding structures.

The control circuit 8 controls the whole rotating electric machine 100. The control circuit 8 has an analog-digital converter and a digital-analog converter, and signals among other composition are inputted and outputted.

The control circuit 8 is constituted by a microcomputer, for example, and by running a predetermined control program, the UVW driver 4A, the XYZ driver 4B, and H bridge driver 6 are controlled so that the rotating electric machine 100 is operated as an electric motor or a generator, and various processing such as an abnormality detection, a notification, etc. are performed.

The input/output circuit 9 inputs and outputs signals between outside via a controlling harness 310, level conversion of the terminal voltage of the high-voltage battery 200 or the voltage of the power ground terminal PGND, and the like.

The input/output circuit 9 is an input-output interface for processing the signals and voltage that are inputted and outputted, and required functions are realized by a custom IC, for example.

A part of the composition for detecting the abnormalities of the rotation angle sensor 7 is included in the input/output circuit 9 in the present embodiment, and the composition thereof will be mentioned later.

A low-voltage battery 202 (a second battery) with the rating of 12V is connected to the power supply circuit 10, and the power supply circuit 10 generates an operating voltage of 5V by, for example, turning a switching element on and off and smoothing an output thereof by a capacitor.

By the operating voltage, the UVW-phase driver 4A, the XYZ-phase driver 4B, the H bridge driver 6, the rotation angle sensor 7, the control circuit 8, and the input/output circuit 9 operate.

The capacitor 12 is for removing or reducing the switching noise that occurs when turning on and off such as the MOS transistors 30 and 31 of the MOS module 3AU in order to operate the electric motor.

Although a single capacitor 12 is used in the example shown in FIG. 1, the number can be changed suitably according to the size of the switching noise.

The above-mentioned UVW-phase driver 4A, the XYZ-phase driver 4B, the H-bridge circuit 5, the H bridge driver 6, the rotation angle sensor 7 (except for the permanent magnet fixed to the rotor), the control circuit 8, the input/output circuit 9, and the power supply circuit 10 are mounted on a single control circuit board 102.

Moreover, as shown in FIG. 1, the rotating electric machine 100 has the power supply terminal PB and the power ground terminal PGND, as well as a connector 400 to which a control ground terminal CGND, a control source terminal CB, and the controlling harness 310, etc. are attached.

The power supply terminal PB is a positive side input/output terminal of the high voltage, and the high-voltage battery 200 and the high-voltage load 210 are connected through a predetermined cable.

The control source terminal CB is a positive side input terminal of the low voltage, and the low-voltage battery 202 and the low-voltage load 204 are connected through a predetermined cable.

The power ground terminal PGND is a first ground terminal, and is for grounding a power system circuit.

This power ground terminal PGND is connected to a vehicle frame 500 through a grounding harness 320 as a first connecting cable.

The MOS module groups 3A and 3B (electric power converter) and the H-bridge circuit 5 (magnetization circuit) mentioned above are the power system circuit.

The MOS transistors 30, 31, 50, and 51 as power elements where the same current as the stator windings 1A and 1B or the field winding 2 flows are included in the power system circuit.

Moreover, the control ground terminal CGND is a second ground terminal prepared independently for the power ground terminal PGND, and is for grounding a control system circuit.

This control ground terminal CGND is grounded through a grounding cable 330 (a second connecting cable) other than the grounding harness 320.

The diode 11 is inserted between the control ground terminal CGND and a frame of the rotating electric machine 100 (henceforth called the ISG frame) 110 through an internal wiring of the input/output circuit 9.

Specifically, a cathode of the diode 11 is connected to a frame ground terminal FRMGND, and the frame ground terminal FRMGND is connected to the ISG frame 110.

The above-mentioned UVW-phase driver 4A, the XYZ-phase driver 4B, the H bridge driver 6, the rotation angle sensor 7, the control circuit 8, the input/output circuit 9, etc. are the control system circuit.

In addition, a connection position of the grounding cable 330 is a position where a ground potential is 0V prepared in the vehicle side, and there shall be no voltage variation.

Moreover, although the diode 11 is disposed outside the input/output circuit 9 in FIG. 1, the diode 11 may be mounted in the input/output circuit 9.

The connector 400 is for attaching the controlling harness 310, the grounding cable 330, and other cables to terminals (the control ground terminal CGND, the control source terminal CB, etc.) other than the power supply terminal PB and the power ground terminal PGND.

The ISG frame 110 of the rotating electric machine 100 mentioned above is the conductor formed by aluminum die-casting, for example, and the ISG frame 110 is fixed to an engine (E/G) block 510 with bolts.

Furthermore, the engine block 510 is connected to the vehicle frame 500 by the grounding harness 322.

The rotating electric machine 100 for vehicles of the present embodiment has such composition as mentioned above, and the composition and operation of detecting the abnormalities of the rotation angle sensor 7 will be explained next.

It is determined whether the abnormalities of the rotation angle sensor 7 exists or not based on the phase voltage induced by one of the stator windings 1A during the power generation in the present embodiment.

Moreover, when the abnormality occurs in the rotation angle sensor 7, the control circuit 8 has means for notifying that notifies the occurrence externally (for example, to an ECU 600).

Since a driver can be notified the occurrence of the abnormality from the ECU 600, the driver can take early measures including checks, repairs, and exchanges.

In order to perform an abnormality detection action and a notification action mentioned above, the composition shown in FIG. 5 is provided.

Figure 5:
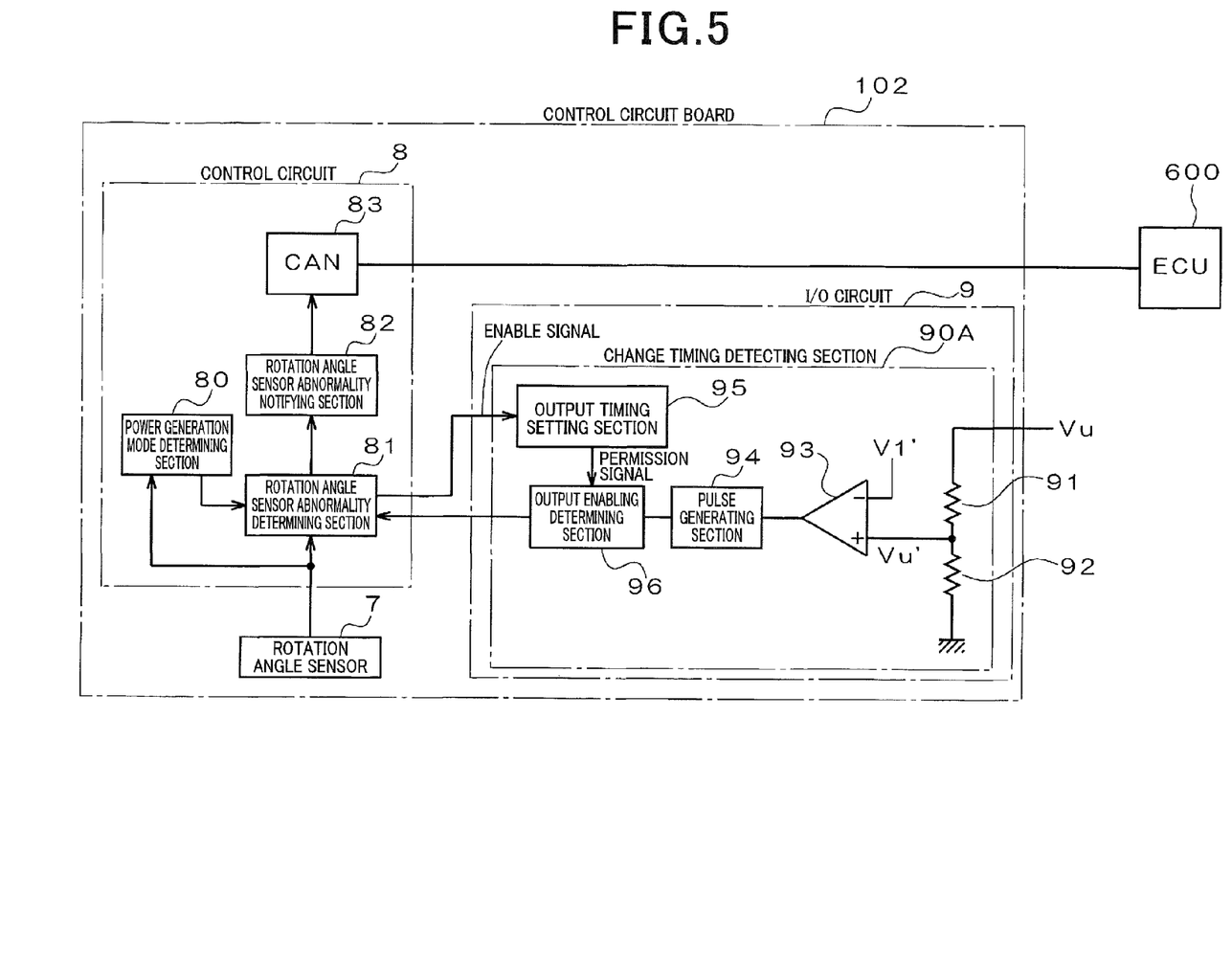
FIG. 5 shows a composition that performs an abnormality detection action and a notification action.

The input/output circuit 9 shown in FIG. 5 has a change timing detecting section 90A.

The change timing detecting section 90A includes resistors 91 and 92, a voltage comparator 93, a pulse generating section 94, an output timing setting section 95, and an output enabling determining section 96.

The resistors 91 and 92 divide the phase voltage Vu that appears in the U-phase winding of the stator winding 1A during the power generation.

The phase voltage Vu' divided by the resistors 91 and 92 is inputted into a positive input terminal of the voltage comparator 93, and a predetermined threshold voltage V1' is inputted into a negative input terminal of the voltage comparator 93, respectively, and the voltage comparator 93 outputs a high level when the phase voltage Vu' is higher than the threshold voltage V1', and outputs a low level otherwise.

It should be noted that since noise components etc. are contained in a waveform of actual phase voltage Vu' so that a voltage value varies, it is desirable to use a voltage comparator 93 having hysteresis in a threshold value, or to smoothen the phase voltage Vu' by inserting a filter in a preceding stage of the plus input terminal of the voltage comparator 93.

Further, these two techniques may be combined

Figure 6:
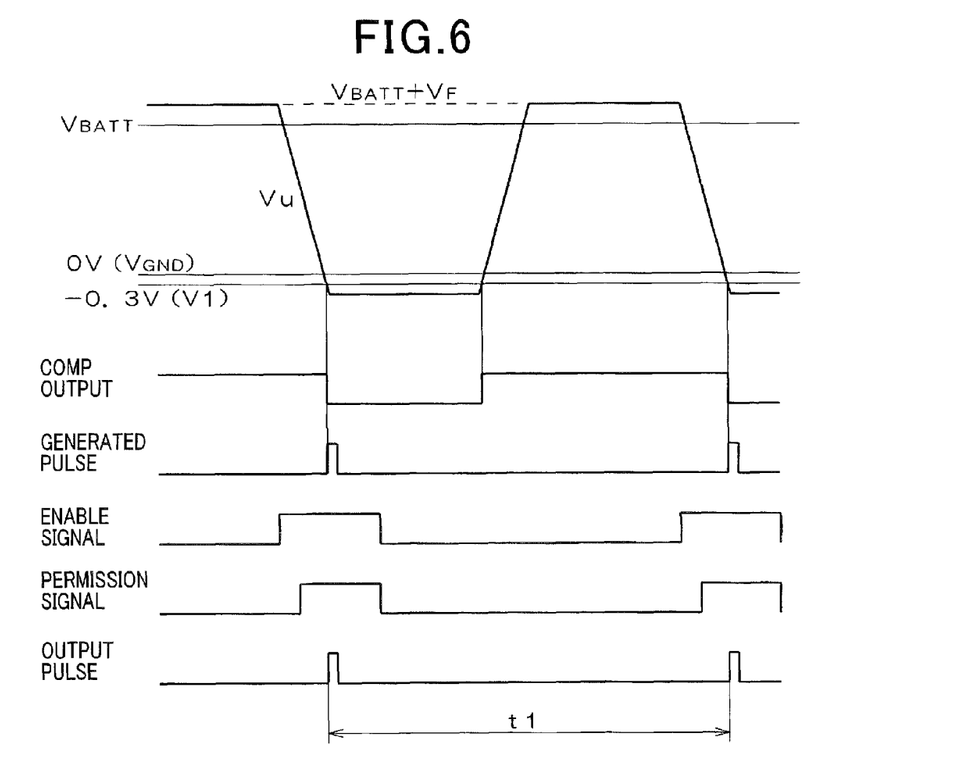
FIG. 6 is an explanatory diagram of a rotational speed detection based on a phase voltage.

In FIG. 6, Vu denotes a voltage of the U-phase winding of the stator winding 1A. The COMP output denotes an output signal of the voltage comparator 93.

Moreover, a generated pulse denotes an output signal of the pulse generating section 94, and an enable signal denotes an enable signal inputted into the output timing setting section 95 from a rotation angle sensor abnormality determining section 81.

A permission signal denotes a permission signal inputted into an output enabling determining section 96 from the output timing setting section 95. An output pulse denotes an output signal of the output enabling determining section 96.

During the power generation in a diode rectification mode (mentioned later), the phase voltage Vu synchronizes with a rotation of the rotor 20, and periodically changes between a ground voltage $V_{GND}$ and a positive side voltage $V_{BATT}$ of the high-voltage battery 200 (to be exact, shifted by a forward voltage VF (for example, 0.7V) of the diode connected in parallel with the MOS transistors 30 and 31).

In the example shown in FIG. 6, the predetermined threshold V1 is set to −0.3V (assuming that the voltage dividing ratio of the voltage divider constituted by the resistors 91 and 92 is r, a relation of V1'=rxV1 between the threshold V1' inputted into the negative terminal of the voltage comparator 93).

The output of the voltage comparator 93 becomes high level when Vu>V1, and becomes low level otherwise (refer to COMP output of FIG. 6).

The pulse generating section 94 detects a falling timing of the output signal of the pulse generating section 94 (for example, an edge detection is performed), and outputs a pulse signal synchronizing with the detected timing (refer generated pulse of FIG. 6).

When the enable signal (referred to as enable signal of FIG. 6, as will also be mentioned later) is inputted, the output timing setting section 95 outputs the permission signal generated by filter processing to the enable signal.

When the permission signal is inputted (when the permission signal becomes high level), the output enabling determining section 96 outputs the pulse signal inputted from the pulse generating section 94 to the control circuit 8, and will it (refer output pulse of FIG. 6).

Moreover, the control circuit 8 shown in FIG. 5 has a power generation mode determining section 80, the rotation angle sensor abnormality determining section 81, a rotation angle sensor abnormality notifying section 82, and a CAN (Controller Area Network) control section 83.

The power generation mode determining section 80 determines the power generation mode that shows contents of a rectification during the power generation.

Specifically, the power generation modes include a synchronous rectification mode that rectifies by turning the MOS transistors 30 and 31 on and off by turns, and a diode rectification mode that rectifies by energizing electricity through the diodes connected in parallel while the MOS transistors 30 and 31 are always turned off.

When the power generation starts, the power generation mode is set to the diode rectification mode.

Moreover, when a predetermined synchronous rectification starting conditions are fulfilled during the power generation by the diode rectification mode, the power generation mode shifts to the synchronous rectification mode.

Furthermore, when a predetermined synchronous rectification ending conditions are fulfilled during the power generation by the synchronous rectification mode, the power generation mode shifts to the diode rectification mode.

Accordingly, the power generation by the synchronous rectification mode and the power generation by the diode rectification mode are switched according to a situation.

It should be noted that, in the present embodiment, the synchronous rectification starting conditions and the synchronous rectification ending conditions are configured to become the diode rectification mode when it is in the low output power generation time (for example, output current (DC) is below 10A).

The power generation mode determining section 80 determines that the power generation mode is in the diode rectification mode in the low output power generation time.

Moreover, the contents of the power generation mode configured by the power generation mode determining section 80 are sent to the rotation angle sensor abnormality determining section 81.

The rotation angle sensor abnormality determining section 81 determines that the rotation angle sensor 7 has abnormalities when a rotational speed N1 (a first rotational speed) detected based on the phase voltage Vu induced by the stator winding 1A and a rotational speed N2 (a second rotational speed) detected based on the output of the rotation angle sensor 7 do not match.

Specifically, the rotation angle sensor abnormality determining section 81 measures an interval t1 (FIG. 6) of the pulse outputted from the output enabling determining section 96, and by using the pulse interval t1 and the number P of poles of the rotor 20, the rotation angle sensor abnormality determining section 81 computes the rotational speed N1 (rpm) (=(60/t1)/P).

Moreover, the rotation angle sensor abnormality determining section 81 compares the rotational speed N1 computed by the above method with the rotational speed N2 detected based on the output of the rotation angle sensor 7, and when these do not match, it is determined that the rotation angle sensor 7 has abnormalities.

The matching of the rotational speeds N1 and N2 includes not only a case where the rotational speeds N1 and N2 have exactly the same value, but a case where a difference between the two is within a predetermined value.

That is, when the difference between the rotational speed N1 and N2 is less than the predetermined value, it is determined that the rotation angle sensor 7 is normal, and when there is a difference exceeding the predetermined value, it is determined that the rotation angle sensor 7 has abnormalities.

Moreover, the determination of whether the abnormalities are present in the rotation angle sensor 7 by the rotation angle sensor abnormality determining section 81 is performed during the power generation time, and when the power generation mode is the diode rectification mode.

Since it becomes the diode rectification mode during the low output power generation as mentioned above, the timing of determining whether the abnormalities are present in the rotation angle sensor 7 may be limited to the time of low output power generation.

Moreover, the rotation angle sensor abnormality determining section 81 does not always receive the pulse signal outputted from the output enabling determining section 96 in the present embodiment, but receives the pulse signal according to the timing of outputting the enable signal.

When a condition for performing the abnormality determination of the rotation angle sensor 7 is satisfied (when it is during the power generation, and the power generation mode is the diode rectification mode), the rotation angle sensor abnormality determining section 81 will output the enable signal that shows the timing of obtaining the pulse signal (refer to FIG. 6 enable signal).

The output timing and a period of high level of the enable signal is configured according to the rotation angle or the rotational speed detected by the rotation angle sensor 7 so that the pulse signal in which the output timing varies interlocked with the rotational speed can be obtained reliably.

The rotation angle sensor abnormality notifying section 82 is the means for notifying, and when the rotation angle sensor abnormality determining section 81 determines that the rotation angle sensor 7 has abnormalities, it sends a notice notifying the determination to the ECU 600.

The notice can be sent to the ECU 600 by CAN communication using a CAN protocol realized by the CAN control section 83, for example.

In addition, other communication method such as LIN communication using a LIN (Local Interconnect Network) protocol may also be used.

Thus, since it is not necessary to provide two rotation angle sensors in order to detect the abnormalities of the rotation angle sensor 7 in the rotating electric machine 100 of the present embodiment, expansion of a mounting space like a case of mounting the two rotation angle sensors becomes unnecessary, and the increase in cost of components or cost of the whole product can be suppressed.

Especially, only a circuit etc. that computes the rotational speed based on the phase voltage Vu of the stator winding 1A is added in order to perform the abnormality determination of the rotation angle sensor 7, thus addition of a big component like a rotation angle sensor becomes unnecessary.

Moreover, the MOS module group 3A as an electric power converter has the three-phase bridge circuit constituted by a plurality of MOS transistors 30 and 31 to which the diode is connected in parallel with the MOS transistor, and the rotation angle sensor abnormality determining section 81 determines whether the abnormalities of the rotation angle sensor 7 exists or not at the time of the diode rectification that sends current through the diode during the power generation.

Thereby, the influence of noise that occurs when turning the MOS transistors 30 and 31 on and off can be eliminated, and it becomes possible to raise the detection accuracy of the rotational speed based on the phase voltage Vu, so that the abnormalities of the rotation angle sensor 7 can be detected with high accuracy.

Moreover, the rotating electric machine 100 performs the diode rectification during the low output power generation that is below a predetermined output, and the rotation angle sensor abnormality determining section 81 determines whether the abnormalities of the rotation angle sensor 7 exists or not during the low output power generation. A heat generation accompanying the diode rectification can be suppressed if it is during the low output power generation.

Moreover, there is provided the voltage comparator 93 that compares the phase voltage Vu induced by the phase winding of the stator winding 1A with the predetermined threshold V1, and detects the timing that the phase voltage Vu changes by exceeding the predetermined threshold V1.

The rotation angle sensor abnormality determining section 81 computes the rotational speed based on a repetition interval t1 of the change timing detected by the voltage comparator 93. Thereby, the detection of the rotational speed becomes easy and highly precise.

Especially, the threshold V1 mentioned above is configured to a voltage (−0.3V) lower than the ground voltage $V_{GND}$.

Accordingly, the detection of the rotational speed based on the phase voltage Vu can be performed when an amplitude of the phase voltage becomes large and the power generation is ensured, and it becomes possible to raise the detection accuracy of the rotational speed based on the phase voltage Vu, and to detect the abnormalities of the rotation angle sensor 7 with high accuracy.

Moreover, there is provided the rotation angle sensor abnormality notifying section 82 that notifies the fact when it is determined by the rotation angle sensor abnormality determining section 81 that the rotation angle sensor 7 has abnormalities.

Thereby, it becomes possible to notify the driver of the occurrence of the abnormality, so that the driver can take early measures including checks, repairs, and exchanges.

In addition, the present disclosure is not limited to the embodiment mentioned above, and various modifications can be employed within the limits of the scope of the present disclosure.

For example, although the embodiment mentioned above explains the rotating electric machine 100 for the vehicle that operates as the ISG, the present disclosure is applicable also to a rotating electric machine for a vehicle that performs either electric operation or power generation as long as the rotation angle sensor 7 is provided.

Moreover, although it is configured to provide the two stator windings 1A and 1B and the two MOS module groups 3A and 3B in the embodiment mentioned above, the present disclosure is applicable also to a rotating electric machine provided with a single stator winding 1A and a single rectifier module group 3A, or a rotating electric machine provided with more than three stator windings and MOS modules.

Further, although the predetermined threshold V1 that is compared with the phase voltage Vu induced by the phase winding of the stator winding 1A is configured to a voltage (−0.3V) lower than the ground voltage $V_{GND}$ in the embodiment mentioned above, it may be configured to be another voltage.

For example, even when configuring a predetermined threshold into a voltage higher than the positive side voltage $V_{BATT}$ of the high-voltage battery 200, it is possible to detect the rotational speed based on the phase voltage during the time the amplitude of the phase voltage becomes large and the power generation is ensured, thus it becomes possible to detect the abnormalities of the rotation angle sensor 7 in high accuracy by raising the detection accuracy of the rotational speed based on the phase voltage.

Moreover, although the single change timing detecting section 90A is provided so as to correspond to the single phase voltage Vu of one of the stator windings 1A in the embodiment mentioned above, the change timing detecting section may be provided so as to correspond to each of a plurality of phase voltages of the stator winding 1A.

Figure 7:
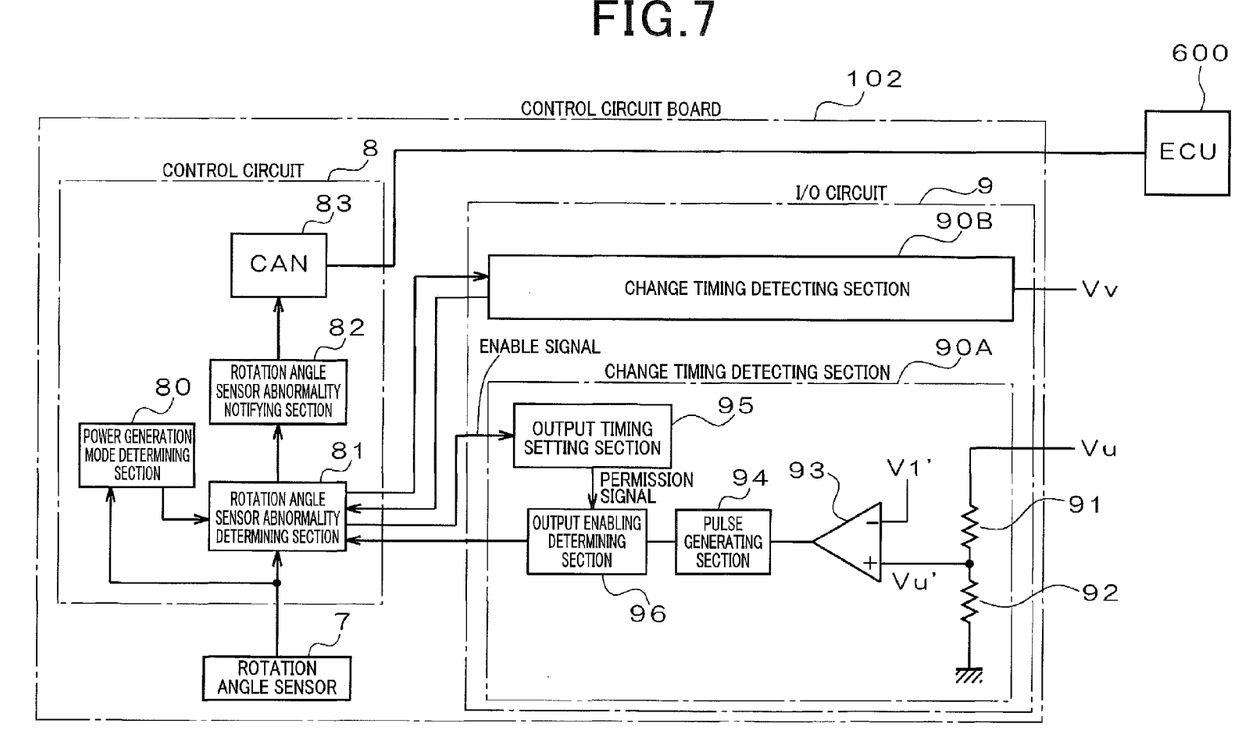
FIG. 7 shows a modification of a rotational speed detection based on the phase voltage.

In the example shown in FIG. 7, the change timing detecting section 90A is provided so as to correspond to to the phase voltage Vu of the stator winding 1A, and a change timing detecting section 90B is provided so as to correspond to the phase voltage Vv of the stator winding 1A.

The change timing detecting section 90B has the same composition as the change timing detecting section 90A.

However, for the threshold V1 of the voltage comparator 93 provided for each change timing detecting sections 90A and 90B, the same value or the different value may be used.

Figure 8:
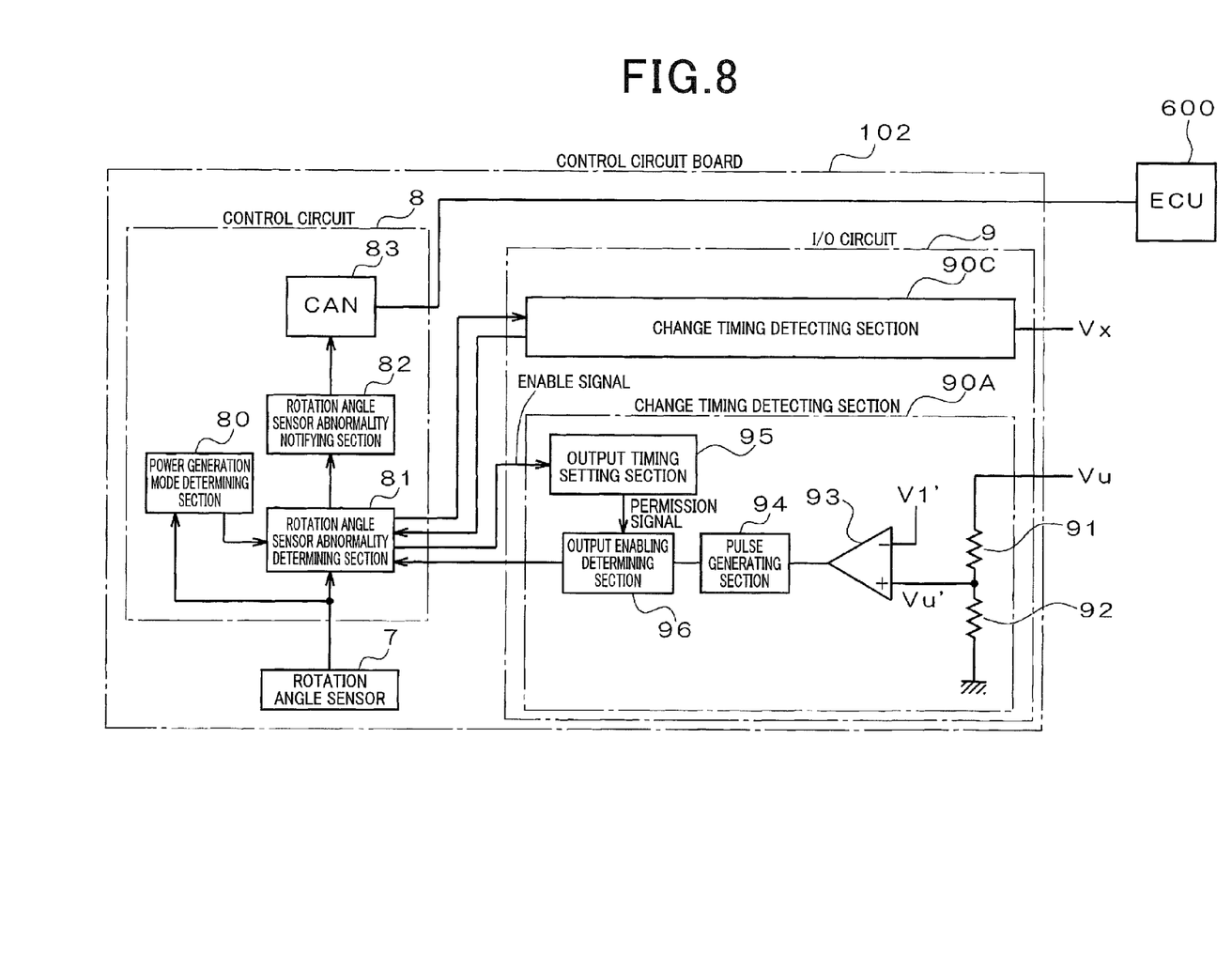
FIG. 8 shows another modification of a rotational speed detection based on the phase voltage.

Moreover, the change timing detecting section may be provided so as to correspond to each phase voltage of the two stator windings 1A and 1B.

In the example shown in FIG. 8, the change timing detecting section 90A is provided so as to correspond to the phase voltage Vu of the stator winding 1A, and a change timing detecting section 90C is provided so as to correspond to the phase voltage Vx (a phase voltage that appears in the X-phase winding of the stator winding 1B) of the stator winding 1B.

The change timing detecting section 90C has the same composition as the change timing detecting section 90A.

However, for the threshold V1 of the voltage comparator 93 provided for each change timing detecting sections 90A and 90C, the same value or a different value may be used.

The rotation angle sensor abnormality determining section 81 computes the rotational speed N1 for each of the two voltage comparators 93, and determines that the rotation angle sensor 7 has abnormalities when both of these two rotational speeds N1 do not match the rotational speed N2 detected based on the output of the rotation angle sensor 7.

Thereby, it becomes possible increase redundancies of composition required for the abnormality detection of the rotation angle sensor 7, and further raise the abnormality detection accuracy of the rotation angle sensor 7.

Moreover, by determining that there are no abnormalities in the rotation angle sensor 7 when at least any one of a plurality of the rotational speeds N1 is matching with the rotational speed N2, incorrect detections of the abnormalities in the rotation angle sensor by the variation at the time of computing the plurality of the rotational speed based on the phase voltage can be prevented.

According to the present disclosure as mentioned above, since it is not necessary to provide two rotation angle sensors in order to detect the abnormalities of the rotation angle sensor, the expansion of the mounting space like a case of mounting the two rotation angle sensors becomes unnecessary, and the increase in cost of components or cost of the whole product can be suppressed.

What is claimed is:

1. A rotating electric machine for vehicles comprising:
  a rotor;
  a stator disposed facing to the rotor, the stator having stator windings;
  an electric power converter that: (i) converts an alternating current voltage induced by the stator windings into a direct current voltage, or (ii) converts the direct current voltage applied from an outside into the alternating current voltage, and applies the converted alternating current voltage to the stator windings;
  a rotation angle sensor that detects a rotation angle of the rotor; and
  a rotation angle sensor abnormality determining section that determines: (i) whether abnormalities of the rotation angle sensor exist based on a phase voltage induced by the stator windings during power generation, and (ii) that the rotation angle sensor has abnormalities when a first rotational speed detected based on the phase voltage induced by the stator windings and a second rotational speed detected based on an output of the rotation angle sensor do not match.

2. The rotating electric machine for the vehicles according to claim 1, wherein,
  the electric power converter has a bridge circuit including a plurality of switching elements where a diode is connected in parallel with each of the plurality of the switching elements; and
  the rotation angle sensor abnormality determining section determines whether any abnormalities of the rotation angle sensor exist or not during a diode rectification that sends current through the diode during the power generation.

3. The rotating electric machine for the vehicles according to claim 2, wherein,
  the diode rectification is performed during a low output power generation that is below a predetermined output; and
  the rotation angle sensor abnormality determining section determines whether abnormalities of the rotation angle sensor exist or not during the low output power generation.

4. The rotating electric machine for the vehicles according to claim 1, wherein, the rotating electric machine further includes a voltage comparator that: (i) compares the phase voltage induced by the phase winding of the stator winding with a predetermined threshold, and (ii) detects a timing at which the phase voltage exceeds the predetermined threshold; and the rotation angle sensor abnormality determining section computes the first rotational speed based on a repetition interval of the timing detected by the voltage comparator.

5. The rotating electric machine for the vehicles according to claim 4, wherein, the predetermined threshold is configured to be a voltage lower than a ground voltage, or to a voltage higher than a positive side voltage of a battery connected outside.

6. The rotating electric machine for the vehicles according to claim 4, wherein, the rotating electric machine further includes a plurality of the voltage comparators corresponding to the stator windings; and the rotation angle sensor abnormality determining section computes the first rotational speed for each of the plurality of the voltage comparators.

7. The rotating electric machine for the vehicles according to claim 6, wherein, the rotation angle sensor abnormality determining section determines that the rotation angle sensor has abnormalities when none of a plurality of the first rotational speeds corresponding to the plurality of voltage comparators match the second rotational speed detected by the rotation angle sensor.

8. The rotating electric machine for the vehicles according to claim 4, wherein, the stator winding includes a plurality of three-phase windings;

the voltage comparator is provided corresponding to each of the plurality of the three-phase windings; and the rotation angle sensor abnormality determining section computes the first rotational speed for each of the plurality of voltage comparators corresponding to each of the plurality of the three-phase windings.

9. The rotating electric machine for the vehicles according to claim 1, wherein, when it is determined by the rotation angle sensor abnormality determining section that the rotation angle sensor has abnormalities, there is provided a means for externally notifying an occurrence of the abnormalities.

\* \* \* \* \*